United States Patent [19]

Hayashi et al.

[11] Patent Number: 5,175,632
[45] Date of Patent: Dec. 29, 1992

[54] MULTIPLE IMAGE PROCESSING SYSTEM

[75] Inventors: Kazuo Hayashi; Hiroshi Takayanagi, both of Kanagawa, Japan

[73] Assignee: Fuji Xerox Co., Ltd., Tokyo, Japan

[21] Appl. No.: 595,883

[22] Filed: Oct. 10, 1990

[51] Int. Cl.⁵ .............................................. H04N 1/40
[52] U.S. Cl. .................................. 358/401; 358/412; 358/486
[58] Field of Search ............... 358/400, 401, 404, 405, 358/406, 407, 409, 411, 412, 426, 434, 438, 439, 443, 444, 467, 468, 474, 476, 486; 379/100

[56] References Cited

U.S. PATENT DOCUMENTS

| | | | |
|---|---|---|---|
| 4,160,279 | 7/1979 | Fuwa | 358/426 |
| 5,095,372 | 3/1992 | Silverberg | 358/468 |
| 5,119,206 | 6/1992 | Rourke et al. | 358/401 |

FOREIGN PATENT DOCUMENTS

| | | | |
|---|---|---|---|
| 0067376 | 4/1982 | Japan | 358/486 |
| 0064870 | 4/1983 | Japan | 358/412 |
| 1507245 | 4/1978 | United Kingdom | 358/412 |

Primary Examiner—Edward L. Coles, Sr.
Assistant Examiner—Jerome Grant, II
Attorney, Agent, or Firm—Finnegan, Henderson, Farabow, Garrett and Dunner

[57] ABSTRACT

An image processing system which enters the type of original document, page order, the number of hard copies, an image reader for reading an image on the original document, an image output section for applying predetermined data processing to the image data read by the image read section, and transmitting image data of a predetermined gradation, selectively changing the speed of transmitting the image data, storing the image data, selectively changing time intervals between producing hard copies, and controlling the selection of the speed of transmitting image data set by image data selection, and the selection of the copy output interval of the image output means set by the output time interval selection means, in accordance with the data entered from the job entered.

15 Claims, 4 Drawing Sheets

MULTIPLE IMAGE PROCESSING SYSTEM

BACKGROUND OF THE INVENTION

1. Field of the Invention

The present invention relates to a multiple image processing system which is capable of producing image data output from a plurality of different types of input devices, in the form of a hard copy. Examples of the different types of input devices are an image input terminal (IIT) for reading an image of an original document and producing digital image data of a preset gray level, personal computers (PCs), and facsimiles (FAX). More particularly, the present invention relates to a multiple image processing system which is operable in a normal quality mode and also in a high quality mode.

2. Discussion of the Prior Art

Recently, developments have been made in digital image recording systems in which any of the image data, as read by the IIT, prepared by the PC, or received by the FAX, may be handled by using a single image output terminal (IOT).

In a prior art system, shown in FIG. 6, a user interface (UI) 40 is constructed with either the combination of a monochromatic or color CRT, and hard buttons or soft buttons, or, the combination of a display device, for example, a liquid crystal display device, and a control panel. From the UI 40, a user enters and sets up copy jobs specifying, for example, the number of copies, magnification, paper size, and edits to be applied to the image data. In the digital image recording system shown in FIG. 6, the UI 40 is also used when the user selects the image data to be copied from the output image data of a PC 41, an IIT 43 and, a FAX 44. The contents of a copy job as prepared at the UI 40 are transferred to a control unit 45.

Several different input devices may be used in conjunction with the UI 40 and the IOT 46. For example, PC 41 may be provided with a keyboard as an input device, a pointing device, and a color CRT as an output device. Documents, figures, and tables may be formed by the PC 41. A bit mapping circuit 42 receives code data from the PC 41, and generates a bit map of the received code data.

Another input device, IIT 43, includes a line sensor constructed with a CCD, for example, a drive circuit for the line sensor, a scanner with an A/D converter for converting an analog video signal output from the line sensor into digital image data of a preset number of bits, for example, 8 bits, and an image processing system unit (IPS) for applying various corrections and edits to the image data output from the scanner.

Yet another input device, FAX 44, may receive code data through a telephone line, for example, code data as specified by the CCITT, and convert it into image data to be processed.

The IOT 46, connected to each of the input devices through control unit 45, is provided with a black developing unit. If necessary, a single color developing unit or a plurality of color developing units may be coupled to the image output device 46.

The control unit 45 executes copy jobs as prepared by the UI 40 and oversees the operations of the image recording system in a supervisory manner.

As shown, the image recording system illustrated in FIG. 6 includes the PC 41, the IIT 43, and the FAX 44, which are for generating digital image data. In use, the IOT 46 is shared by these units.

When a copy job, prepared at the UI 40, contains image data generated by the PC 41, the control unit 45 transfers the image data supplied from the PC 41, to the IOT 46. The data output from the PC 41, when it is bit map data, is directly applied to the IOT 46. When the data output from PC 41 is code data, it is applied to the bit mapping circuit 42 where it is converted into bit map data. The bit map data is then sent to the image output device 46.

When the copy job, prepared at the UI 40, is to copy and output the image data as read by the IPS, the control unit 45 receives the image data output from the IIT 43 and sends it to the IOT 46.

When the copy job is to copy and transmit the image data received by the FAX 44, the control unit 45 transfers the image data as output from the FAX 44 to the IOT 46. The FAX 44 decodes the received image data and converts it into bit map data.

In the conventional system shown in FIG. 6, the connection of the input devices to the IOT 46 is selective. When any of the input devices is coupled, access of the remaining input devices to the IOT 46 is rejected. Thus, the digital image recording system, shown in FIG. 6, is not operable in the multiple function mode in which a plurality of devices may concurrently run. Therefore, an input device to be used must be selected from those input devices coupled each time it is used. Accordingly, it is difficult to increase the speed of the image processing for recording purposes.

The copy mode, in which a plurality of original documents are copied in a preset page order, and a plurality of copies of each document is produced, is frequently used. This copy mode is called a recirculating document handler (RDH) mode.

To exercise the RDH mode in the conventional image recording system shown in FIG. 6, a single original document is read by the IIT 43 a predetermined number of times, for example, N times. Each time the original document is read, a copy paper is discharged into one of the different bins of a sorter of the IOT 46 as output from the system. This sequence of the operations is time-consuming.

Another problem associated with conventional copying is unacceptable copy quality when copying photographs and documents including a series of fine patterns. When an image on the original document is a photograph or a series fine patterns, the copy must be made with an increased number of gray levels and at a higher resolution as compared with a copy of normal character documents, in order to achieve acceptable copy quality. In a conventional image recording system, as shown in FIG. 6, the gray levels and the resolution are preset at fixed values. Therefore, when a photograph or a document with a series fine patterns is copied using the conventional image recording system, the resultant image has unsatisfactory image quality.

SUMMARY OF THE INVENTION

The present invention has been made in view of the above circumstances and has as one of its objects to provide a multiple image processing system which is operable in the multiple function mode where different types of images may be concurrently processed, and which is operable at high speed, and which further reproduces an image of either normal or high image quality.

Another object of the present invention is to provide a multiple image recording system which can electronically execute the RDH function.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, the image processing system of the present invention comprises job entering means for entering copy job data specifying a type of original document, a page order, and a number of copies, image read means for reading an image on the original document, image data output means for applying predetermined data processing to the image data read by the image read means, and for transmitting image data of a predetermined gradation at a predetermined speed, speed selection means, connected to the image data output means, for selectively changing the predetermined speed, data storage means, connected to the image data output means, for storing the read image data, image output means, connected to the data storage means, for transmitting the read image data from the data storage means in the form of hard copies of the original document, the hard copies of the original document being transmitted at a predetermined interval, output interval selection means, connected to the image output means. for selectively changing the predetermined interval, and means for controlling the speed of transmitting image data set by the image data selection means and the interval between outputting hard copies of the original document set by the output interval selection means. in accordance with the copy job data entered from the job entering means.

BRIEF DESCRIPTION OF THE DRAWINGS

The accompanying drawings, which are incorporated in and constitute a part of this specification, illustrate a preferred embodiment of the present invention and, together with the description, serve to explain the objects, advantages and principles of the present invention. In the drawings.

DETAILED DESCRIPTION OF THE PREFERRED EMBODIMENTS

Figure 1:
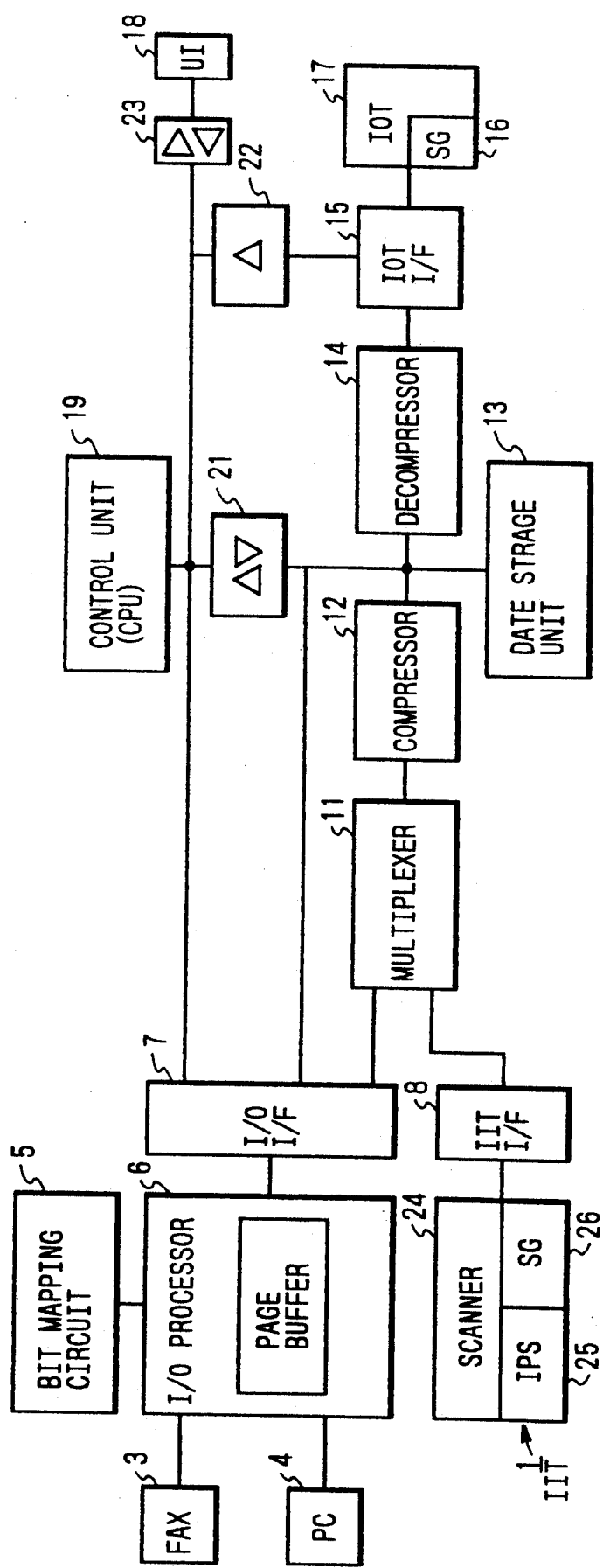
FIG. 1 is a block diagram showing the arrangement of a preferred embodiment of a multiple image processing system according to the present invention.

FIG. 1 is a block diagram of an arrangement of a preferred embodiment of a multiple image processing system according to the present invention.

FIG. 1 shows a UI 18 for preparing copy jobs, an IOT 17 for producing an image, an IIT 1 which reads an image from a document, applies corrections and other processings to the image data, and converts the image data into image data having a predetermined gradation, a multiple processing control unit 5 to 8, 11 to 15, 21 to 23 which is coupled with image data processors 3, and 4, such as a PC and a FAX, and enables the image processing system to concurrently process the image data output from the image data processors, and a control unit 19 for controlling the operations in a supervisory manner.

The multiple image processing system is operable in two copy modes, a normal quality mode, in which the copy is of a normal image quality, and a high quality mode, in which the copy is of a high image quality. The multiple processing control unit comprises data compressing means 12, for compressing image data, a multiplexer 11 which selects the data input to the data compressing means 12, data decompressing means 14, for decompressing the compressed data into original data, and data storage means 13 for storing data. The control unit compresses the image data output from the IIT 1 and the image data processors 3, and 4, and stores the data into data storage means 13, and decompresses the compressed data and outputs the decompressed data to the IOT 17.

With such an arrangement, in the high quality mode, the control unit 19 detects the activation of the high quality mode and sets the speed of the transfer of the image data from the IIT 1 to the multiple processing control unit to be slower than the speed in the normal copy quality mode. Further, the control unit 19 controls the intervals between copy outputs from the IOT 17.

With this feature, the multiple image processing system can copy an original document that requires a higher image quality than a normal character document, and can produce a hard copy with a desired image quality.

In processing the image data from the image data processors, such a the IIT 1, FAX 3, and PC 4, the image data is stored in the data storage means 13 and is read therefrom when it is later required. Therefore, concurrent or parallel processing of the image data is possible. During the prescan and scan return of the IIT 1, the image data from the image data processors, such as FAX 3 and the PC 4, may be sequentially stored in the storage means 13.

If the image data is compressed by the data compressing means 12, stored in the data storage means 13, read out therefrom, decompressed, and transmitted, a plurality of copies can be produced with one image read operation. Thus, the electronic RDH may be achieved wherein by reading the images on a plurality of original documents only one time, a plurality of copies of the original documents may be produced.

In FIG. 1, the input device IIT 1 includes a scanner 24, an IPS 25, and a screen generator SG 26. The scanner 24 reads an image from an original document by means of a color sensor, for example, and makes an offset adjustment and a gain adjustment, converts analog values to digital values of a preset number of bits, e.g., 8 bits, makes a shading correction, and transfers separated color image data of three primary colors, R (red), G (green) and B (blue) to the IPS 25. The IPS 25 applies various types of image processings, such as equivalent neutral density conversion, color masking, document size detection, color change, UCR (under color removal), black generation, mesh-dot removal, edge emphasis, TRC (tone reproduction control), enlargement/reduction, and image editing to the image data output from the scanner 24. The SG 26 converts the image data, which has 8 bits, output from the IPS 25 into image data which has a smaller number of bits. In the preferred embodiment, shown in FIG. 1, the SG 26 converts the image data of 8 bits/pixel into image data of 2 bits/pixel in a normal quality mode, and converts it to image data of 3 bites/pixel in a high quality mode. Data conversion reduces the amount of image data, and hence improves the image data processing speed, and further increases the amount of data that can be stored into a data storage unit 13.

The preferred embodiment of the present invention, shown in FIG. 1, also includes PC 4 as an input device. The bit mapping circuit 5 develops code data transmitted from the PC 4 into bit map data through I/O processor 6. A FAX 3 is also included as an input device. FAX 3 is also coupled to I/O processor 6.

The I/O processor 6, which has a network function, receives the two-level data as decoded by the FAX 3 or the code data from the PC 4, and transfers the data to an I/O interface 7. The I/O processor 6 also develops the code data into bit map data with the bit mapping circuit 5 and transfers the bit map data, or the two-level data, to the I/O interface 7. Additionally, the I/O processor 6 receives code data from the I/O interface 7, and converts it into bit map data with the bit mapping circuit 5, and returns it to the I/O interface 7. Further, the I/O processor 6 receives the image data as read by the IIT 1, from the I/O interface 7, and transfers it to the FAX 3. The I/O processor 6 contains a page buffer 28 as temporary storing means. When a situation prohibits the data from an input device, such as the FAX 3 or the PC 4, to be promptly transferred to the I/O interface 7, the data is temporarily stored in the page buffer 28.

The I/O interface 7 coupled with the I/O processor 6 is connected to a multiplexer 11, the data storage unit 13, and the control unit 19 via buses. The multiplexer 11 selectively sets up a data transfer path from the IIT interface 8 to a compressor 12 and a data transfer path from the I/O interface 7 to the compressor 12.

The compressor 12 is operable in a compress mode and a through mode. In the compress mode, the compressor 12 compresses the image data on the basis of an adaptive predictive encoding system. In the adaptive predictive encoding system, the image data is predicted every pixel by a plurality of types of predictors provided in the compressor 12. If the prediction is true, data "0" is assigned to the pixel signal and the predictor is used for the next prediction. If the prediction is false, data "1" is assigned to the pixel signal and the predictor to be used for the prediction is changed in a predetermined order. The compressed data is decompressed or expanded into the original image data by the decompressor 14 which includes a plurality of different types of reverse predictors. When the compressor 12 is in the compress mode, the adaptive predictive encoding processing is applied to the image data of 2 bits/pixel in the normal quality mode and to the image data of 3 bits/pixel in the high quality mode.

The data storage unit 13 stores the output data of the data compressor 12 and the I/O interface 7. The output data comes in varieties of two-level data, four-level data (2 bits/pixel), eight-level data (3 bits/pixel) and code data. Code data may be directly stored in the data storage unit 13. In this case, the code data is transferred through the I/O interface 7 and does not pass through the bit mapping circuit 5, or the code data may be stored the data storage unit 13 by passing through the multiplexer 11 and the compressor 12. In this case, the compressor 12 is placed in the through mode.

The decompressor 14, connected to compressor 12, is operable both in a decompress mode and a through mode. In the decompress mode, the decompressor 14 decompresses the compressed data into the original data. In the through mode, which is used when the image data is not compressed by the compressor 12, the data is directly output. The output data of the decompressor 14 is transferred through the IOT interface 15 to the IOT 17, where it is reproduced.

Bus controllers 21 to 23 are provided as buses for the control unit 19, the storage unit 13, the IOT interface 15, and UI 18, to control these units. The control unit 19 is provided for controlling the overall multiple image processing system. The control unit 19 reads the data out of the data storage unit 13, through the bus controller 21, alters and edits the image data, and stores the data back into the storage unit 13 again.

The UI 18, connected to bus controller 23, includes a display unit, and a control panel. From the UI 18, a user enters the number of copies, selects the normal quality mode or the high quality mode, prepares copy jobs specifying various functions and edits. The UI 18 then visually presents the entered, selected and prepared items to the user. The UI 18 then fetches the image data from the decompressor 14, through IOT interface 15, and bus controllers 22 and 23. The UI 18 displays the output image of the IOT 17 prior to printing.

The IOT 17, as data output means, is provided with a photoreceptor, a developing unit, and a fuser, and forms an electrostatic latent image on the photoreceptor, applies toner to the latent image, to develop it, transfers the toner image onto copy paper, and fuses and fixes the image onto the copy paper. A black developing unit is provided, and additionally if desired, a color developing unit or a plurality of color units may be included.

In forming the electrostatic latent image in the IOT 17, the image data from the IOT interface 15 must be converted into binary data which controls the writing of every pixel or an even smaller unit of the latent image. For this reason, the screen generator SG 16 is provided. The SG 16 converts the image data output from the IOT interface 15 into binary data, and transfers the binary data to the IOT 17. In the normal quality mode, the image data is converted into binary data consisting of 4 gray levels. In the high quality mode, the image data is converted into binary data consisting of 8 gray levels.

The operation of the multiple image processing system in the normal quality mode will next be described.

In the normal quality mode, when a user enters a copy job from the UI 18, an image on an original document is read by the IIT 1, and one copy of the original document is produced in the normal quality mode. The control unit 19 instructs the IIT 1 to read the image of the document in the normal quality mode, and instructs the multiplexer 11 to connect the IIT interface 8 with the compressor 12. Further, control unit 19 sets the compressor 12 and the decompressor 14 in the through mode, and sets the SG 16 and the IOT 17 to execute processing in the normal quality mode. Under this condition, the scanner 24 reads the document image at a speed as defined for the normal quality mode, generates 8-bit image data, and sends the data to the IPS 25. The IPS 25 applies a given image processing to the image data. The SG 26 then converts, the image data into 2-bit image data, and sends it to the SG 16, through the IIT interface 8, multiplexer 11, compressor 12, decompressor 14, and IOT interface 15. The SG 16 converts the 2-bit image data into binary data of 4 gray levels. The converted binary image data is then transferred to the IOT 17 where the image of the original document is reproduced. Alternatively, the compressor 12 is placed in the compress mode, and the decompressor 14 is set in the decompress mode. The image data is compressed, stored into the storage unit 13, and subsequently read out of the storage unit 13.

When a user enters a copy job from UI 18 requiring a plurality of copies to be produced, the control unit 19 sets the compressor 12 in the compress mode and the decompressor 14 in the decompress mode. The image data of 2 bits/pixel derived from the IIT 1 is compressed by the compressor 12 and the space the data takes up is therefore reduced. The compressed data is stored in the data storage unit 13. The image data is subsequently read out of the storage unit 13 the number of times equal to the number of copies designated, decompressed by the decompressor 14, and transferred through the IOT interface 15 to the SG 16 and IOT 17. Thus, a plurality of copies may be produced with only one image read in the IIT 1. The first copy may be stored in the storage unit 13 while at the same time being decompressed by the decompressor 14, to then be transmitted. This accelerates the copy speed of the first copy.

In the high quality mode, a user enters a copy job from the UI 18 such that an image on such original document is read by the IIT 1, and a plurality of the copies of the document are produced in the high quality mode. The control unit 19 instructs the IIT 1 to read the image of the original document in the high quality mode, and instructs the multiplexer 11 to connect the IIT interface 8 with the compressor 12. Further, control unit 19 sets the compressor 12 into the compress mode and sets the decompressor 14 in the decompress mode. Control unit 19 further sets the SG 16 and the IOT 17 to execute the processing in the high quality mode. Under this condition, the scanner 24 reads the document image at a speed as defined for the high quality mode, generates 8-bit image data, and send the data to the IPS 25. The IPS 25 applies a given image processing to the image data and sends the data to SG 26. The SG 26 converts the image data into 3-bit image data, and sends it to the SG 16, through the IIT interface 8, multiplexer 11, compressor 12, storage unit 13, decompressor 14, and IOT interface 15. The SG 16 converts the 3-bit image data into binary data of 8 gray levels. The converted binary image data is transferred to the IOT 17 where an image in the high quality mode of the original document is reproduced.

The operation speed of the IIT 1 and the operation speed of the IOT 17 in the high quality mode will next be described in detail. In the high quality mode, the amount of image data generated is greater than in the normal quality mode. This results in an increase in the data compressing time required by the compressor 12, the time required to write the data in the storage unit 13, the time required to read the data out of the storage unit 13, and the time required to decompress the data by the decompressing 14. In the high quality mode, the operation speed of the IIT 1 is controlled to be slow in order to be matched to the speed of the compressor 12, the storage unit 13, and the decompressor 14 in the normal operation mode. That is, the amount of image data from the IIT interface 8 is adjusted by slowing down the IIT 1, to allow the compressor 12, the storage unit 13, and the decompressor 14 to be normally operable.

Figure 2:
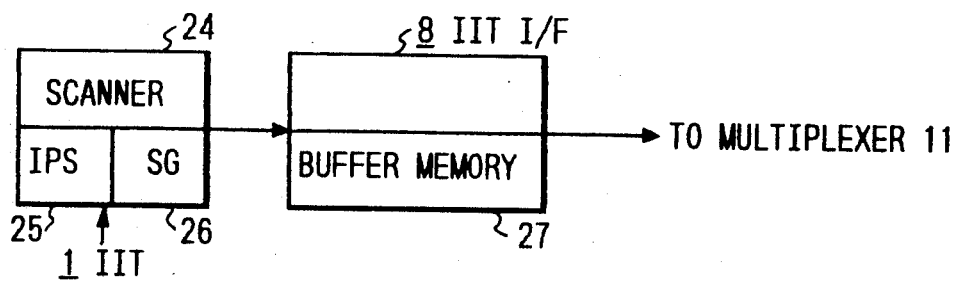
FIG. 2 is a block diagram showing the arrangement of the control of image data in the high quality mode.

There are several ways to slow down the operation speed of the IIT 1. A first way is to decrease the read speed in the main scan direction by reducing the clock frequency of the line senor of the scanner 24. A second way is to decrease the speed of the scanner 24 in the subsidiary scan direction. A third way is to both reduce the clock frequency and decrease the speed of the scanner in the subsidiary direction. A fourth way, is shown in FIG. 2. In FIG. 2, the IIT interface 8 contains a buffer memory 27. The image data of 3 bits/pixel output from the SG 26 is stored in the buffer memory 27. The speed of reading the image data out of the buffer memory 27 is adjusted to match the processing speed of the compressor 12.

Figure 3A:
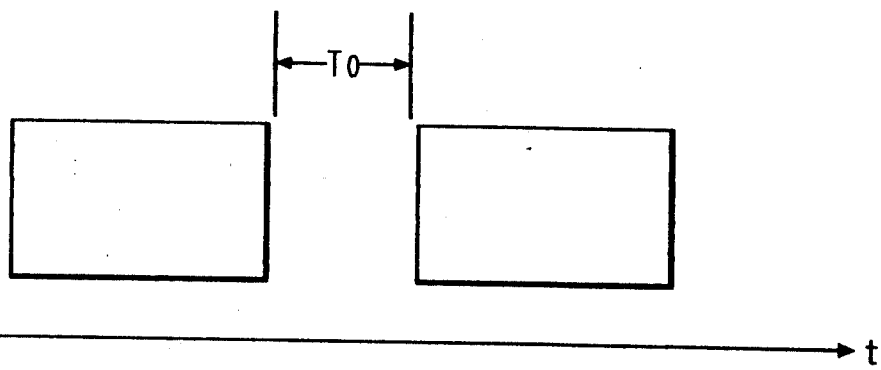
FIGS. 3(a) and 3(b) are graphs explaining intervals between the copy output by the IOT.
Figure 3B:
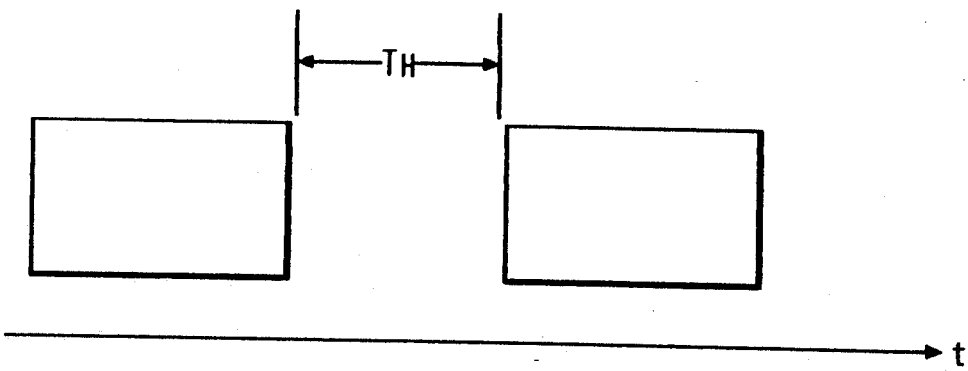

As already described, in the high quality mode, the amount of image data is increased, while the process speed of the IOT 17 remains constant. To compensate for this, the interval between producing subsequent copies is increased, as shown in FIGS. 3(a) and 3(b). The time from producing a first copy until the processing of the next copy is $T_o$ in the normal quality mode, as shown in FIG. 3(a). To compensate for the increase in the image data, the copy output interval is set to b $T_H$ ($>T_o$) in the high quality mode.

Figure 4:
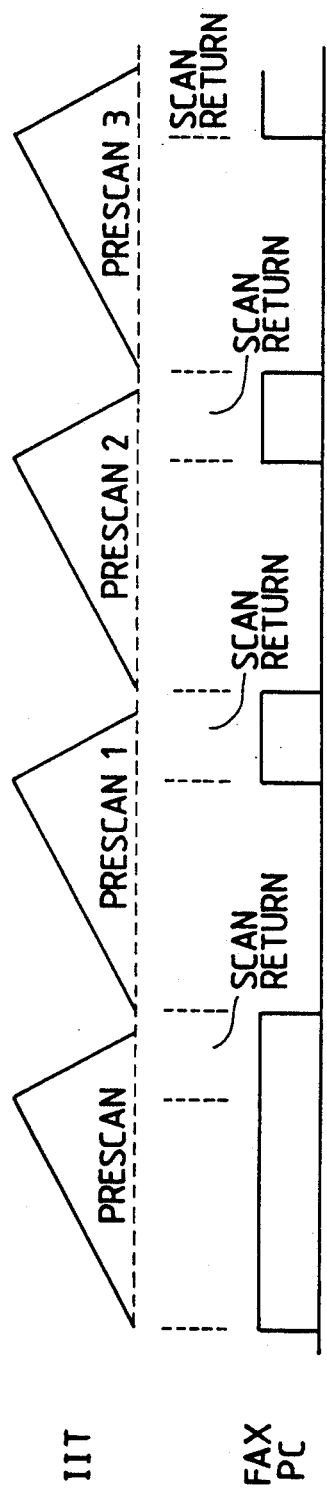
FIG. 4 is a graph explaining multiple function concurrent job processing.

FIG. 4 show a graph explaining multiple function concurrent job processing. As shown in FIG. 4, when the system reads a document image and produces a hard copy of this image, the operation of the IIT 1 consists of a prescan and main scan. Each scan includes a scan return period from the end of an image read to a scan start position. The IPS 25 produces image data only when the image read is carried out by the main scan. During the prescan, detection of document size and marks for edit, are read, and are carried out in the IPS 25. Accordingly, no image data is produced by the IIT 1 during the prescan and the scan return. During the prescan, scan return, and when the IIT 1 rests, the multiplexer 11 is switched from the IIT interface 8 to the I/O interface 7, and the output data from the FAX 3 or the PC 4 may be processed as shown in FIG. 4. To produce a plurality of copies as stated above, the IIT 1 rests after it reads the image. Even during the rest period the data is read out of the storage unit 13 idle time is present. When the IIT 1 reads the document image in the main scan mode or when the copy job requiring a plurality of copies is executed, if image data is transferred from the FAX 3 or the PC 4 to the I/O processor 6, the data is stored in the page buffer until the data transfer is permitted.

The code data, as transferred from the PC 4, is converted into bit map data by the bit mapping circuit 5. Then, the code data is transferred from the I/O interface 7 through the multiplexer 11 to the compressor 12 where it is compressed. The compressed data is stored in the data storage unit 13. When the page buffer 28 has stored some data, and has rejected the storage of additional data, the compressor 12 is placed in the through mode, the code data converted is transferred from the I/O interface 7 to the storage unit 13, either through the multiplexer 11 or directly, and then stored in the storage unit 13. The code data may be transferred through the bus of the control unit 19 and through the bus controller 21. The code data is thus stored intact in the storage unit 13, and, when the I/O processor 6 is idle, transferred to the I/O processor 6 through a route reverse to the route outlined above. The code data is then converted into bit map data by the bit mapping circuit 5, and stored in the data storage unit 13 through the page buffer 28.

Figure 5:
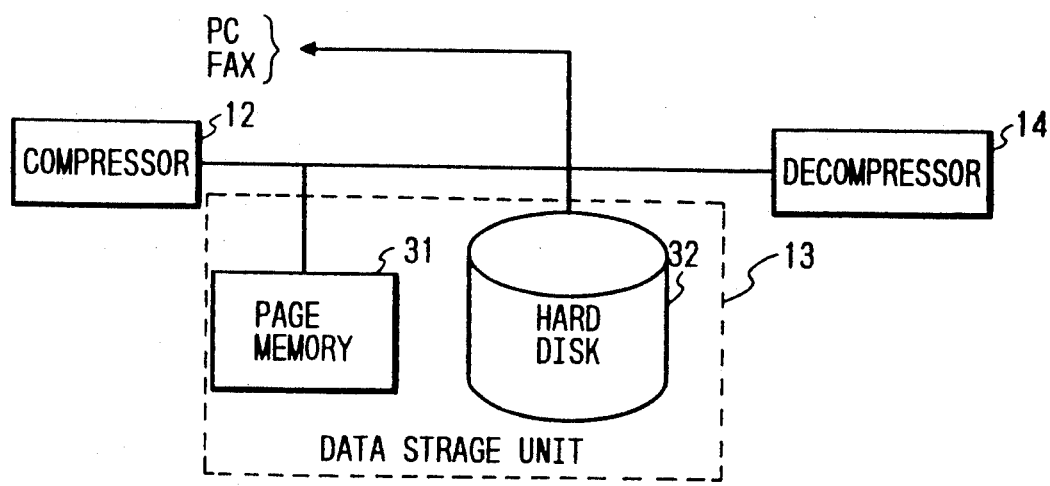
FIG. 5 is a block diagram showing an arrangement of a data storage unit according to a preferred embodiment of the present invention.
Figure 6:
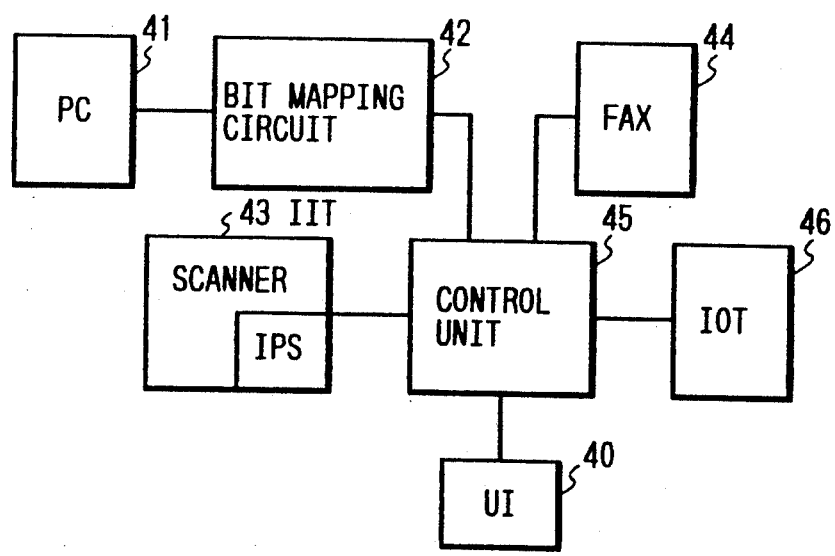
FIG. 6 is a block diagram of a conventional digital data processing system.

FIG. 5 is a block diagram of another embodiment of a multiple image processing system according to the present invention. In this embodiment, the data storage unit 13 includes a page memory 31 and a hard disk 32. The hard disk 32 is used as a main data storage unit.

It should be understood that the present invention is not limited to the above-mentioned embodiments, but may variously be modified, altered, and changed within the scope of the appended claims. In the embodiments, the high quality mode is defined by the increased number of gray levels per pixel. It may be defined by the increased number of pixels per unit length. Essentially, it may be generally applied for a copy mode with an increased amount of image data.

In the embodiments mentioned above, a concurrent job is controlled in so that the image data output from the FAX 3, the PC 4, a WS (work station), or any other image processor is stored in the storage unit 13, when no image data is produced from the IIT 1 and when the image data is read out of the storage unit 13 and transferred to the IOT 17. Other idle times may also be used for a concurrent job. A specific example of another idle time is the period of data compressing. When the compressor 12 fetches the image data and compresses it, the data output is interrupted. This interruption is used for example by the FAX 3 which uses the scanner 24 of the IIT 1, and uses the IOT 24 as its printer. Accordingly, the FAX 3 fetches the image data as read by the IIT 1 through the I/O interface 7 and the I/O processor 6, and encodes the data under the rule of CCITT, for example, and sends the code data other receivers of the FAX 3. When receiving the code data through a transmission line, the FAX 3 decodes the code data, and transfers the decoded data to the I/O processor 6.

As seen from the foregoing description, according to a preferred embodiment of the present invention, a multiple image processing system which is operable in the normal quality mode and high a quality mode is successfully realized with control of the speed of generating image data in the IIT 1 and the copy output intervals, without any additional hardware. In the high quality mode, the image processing system produces a hard copy of high image quality by using image data containing more gradations or resolution data than in the normal quality mode.

The digital image processing system of the present invention can concurrently process the image data output from a copying machine, a personal computer and a facsimile machine. Since a data storage unit is provided, the image data from the personal computer and the facsimile are stored into the storage unit and are subjected to the image output processing by utilizing the period when no processing of the image data from the IIT is performed. The IOT is used by each of the input devices.

Since a compressor and a decompressor are used, the memory area of the data storage unit can effectively be used. Additionally, the memory areas of the IIT, PC, FAX, and IOT can also be increased, and matched to the data processing speed.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order t explain the principle of the invention and its practical application to enable one skilled in the art to utilize the invention is various embodiments and with various modifications as are suited to the particular use contemplated. It is intended that the scope of the invention be defined by the claim appended hereto, and their equivalents.

What is claimed is:

1. A multiple image processing system comprising:

job entering means for entering copy job data specifying a type of original document, a page order, and a number of copies;

image read means for reading an image on the original document;

image data output means for applying predetermined data processing to the image data read by the image read means, and for transmitting image data of a predetermined gradation at a predetermined speed;

speed selection means, connected to the image data output means, for selectively changing the predetermined speed;

data storage means, connected to the image data output means, for storing the read image data;

image output means, connected to the data storage means, for producing the read image data from the data storage means in the form of hard copies of the original document, the hard copies of the original document being produced at a predetermined interval;

output interval selection means, connected to the image output means, for selectively changing the predetermined interval; and means for controlling the speed of transmitting image data set by the speed selection means and the interval between producing hard copies of the original document set by the output interval selection means, in accordance with the copy job data entered from the job entering means.

2. A multiple image processing system comprising:

job entering means for entering copy job data specifying a type of an original document, a page order, and a number of copies;

image reading means for reading an image on the original document;

image data output means, connected to the image reading means, for applying predetermined processing to the image data read by said image reading means and for transmitting image data of a predetermined gradation, at a predetermined speed;

image data speed selection means, connected to the image data output means for selectively setting the predetermined speed of transmitting the image data;

external image data input mean for receiving external image data;

external image data output means, connected to the external image data input means, for transmitting external image data of a predetermined gradation, and at a predetermined speed;

external image data speed selection means, connected to the external image data output means, for selectively setting the predetermined speed of transmitting the external image data;

data storage means, connected to the image data output means and the external image data means, for storing the image data and the external image data;

stored data selection means, connected to the data storage means, for selectively connecting the external image data output means and said image data output means to the data storage means;

image output means, connected to the data storage means, for producing the data stored in the data storage means as a predetermined number of hard copies, the predetermined number of hard copies being produced at a predetermined interval;

output interval selection means, connected to the image output means, for selectively changing the predetermined interval;

multiple processing control means for controlling the reading means, a transfer of the external image data from the external image data output means to the data storage means, a transfer of the image data from the image data output means to the data storage means, and a transfer of data stored in the data storage means to the image output means, in a time divisional manner; and control mean for controlling the speed set by the external image data speed selection means, the speed set by the read image data speed selection means, the data stored in the data storage means by the storage data selection means, and the predetermined interval set by the output interval selection means, in a time divisional manner, and in accordance with the copy job data entered from the job entering means.

3. A multiple image processing system, as recited in claim 2, wherein the control means decreases the predetermined speed of the external image data from the external image data output means, and decreases the predetermined speed of the image data from the image data output means when a copy job with an increased amount of input image data is entered from the job entering means.

4. A multiple image processing system, as recited in claim 3, wherein a copy job with an increased amount of input image data is a copy job requiring an increased gradation and/or an increased resolution.

5. A multiple image processing system, as recited in claim 2, wherein the control means increases the predetermined interval of the image output means when a copy job contains an increased amount of image data entered from the job entering means.

6. A multiple image processing system, as recited in claim 5, wherein a copy job with an increased amount of image data is a copy job requiring an increased gradation and/or an increased resolution.

7. A multiple image processing system, as recited in claim 2, wherein the external image data speed selection means includes a memory for temporarily storing the external image data, wherein the external image data is transmitted from the memory at a predetermined speed, and wherein the control means decreases the predetermined speed of the external image data temporarily stored in the memory when a copy job with an increased amount of external image data is entered from the job entering means.

8. A multiple image processing system as recited in claim 7, wherein copy job with an increased amount of external image data requires an increased gradation and/or an increased resolution.

9. A multiple image processing system comprising:

job entering means for entering a copy job specifying a type of an original document, a page order, and a selected number of hard copies;

image reading means for reading an image on the original document;

image data output means, connected to the image reading means, for applying predetermined processing to the image data read by the image reading means and for transmitting image data with a predetermined gradation, at a predetermined output speed;

image data speed selection means, connected to the image data output means, for selectively changing the predetermined output speed of the image data;

external image data input means for receiving external image data;

external image data output means, connected to the external image data input means, for transmitting the external image data with a predetermined gradation, and at a predetermined output speed;

external image data speed selection means, connected to the external image data output means, for selectively changing the predetermined output speed of the external image data;

data compression means, connected to the image data speed selection means and the external image data speed selection means, for compressing the image data and external image data;

data storage means, connected to the data compression means, for selectively storing the image data compressed by the data compression means;

data decompression means, connected to the data compression means, for decompressing the image data compressed by the data compression means or the image data stored in the data storage means;

stored data selection means, connected to the data storage means, for selectively connecting the external image data output means and the image data output means to the data storage means;

image data output means for producing the image data read out of the data storage means as the selected number of hard copies of the original document, at a predetermined interval;

output interval selection means, connected to the image data output means, for selectively changing the predetermined interval;

multiple processing control means for controlling the reading means, a transfer of the external image data from the external image data output means to the data storage means, a transfer of the image data from the image data output means to the data storage means, and a transfer of data stored the data storage means to the image output means, in a time divisional manner; and control mean for controlling the speed set by the external image data speed selection means, the speed set by the read image data speed selection means, the data stored in the data storage means by the storage data selection means, and the predetermined interval set by the output interval selection means, in a time divisional manner, and in accordance with the copy job data entered from the job entering means.

10. A multiple image processing system as recited in claim 9, wherein the control means decreases the predetermined output speed of the external image data from the external image data output means, and decreases the predetermined output speed of the image data from the image data output means when a copy job with an increased amount of input image data is entered from the job entering means.

11. A multiple image processing system, as recited in claim 10, wherein a copy job with an increased amount of input image data is a copy job requiring an increased gradation and/or an increased resolution.

12. A multiple image processing system as recited in claim 9, wherein the control means increases the predetermined interval of the image output means when a copy job contains an increased amount of image data entered from the job entering means.

13. A multiple image processing system, as recited in claim 12, wherein a copy job with an increased amount of image data is a copy job requiring an increased gradation and/or an increased resolution.

14. A multiple image processing system, as recited in claim 9, wherein the external image data speed selection means includes a memory for temporarily storing the external image data, wherein the external image data is transmitted from the memory at a predetermined speed, and wherein the control means decreases the predetermined speed of the external image data temporarily stored in the memory when a copy job with an increased amount of external image data is entered from the job entering means.

15. A multiple image processing system as recited in claim 14, wherein a copy job with an increased amount of external image data requires an increased gradation and/or an increased resolution.

* * * * *